July 4, 1961 A. G. SCHRAMM 2,990,966
SELF LOWERING TILT BED TRAILER
Filed March 18, 1958 3 Sheets-Sheet 1
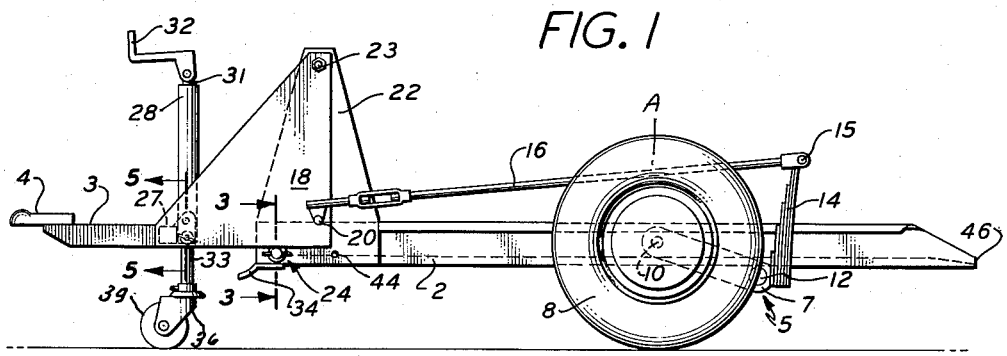
FIG. 1
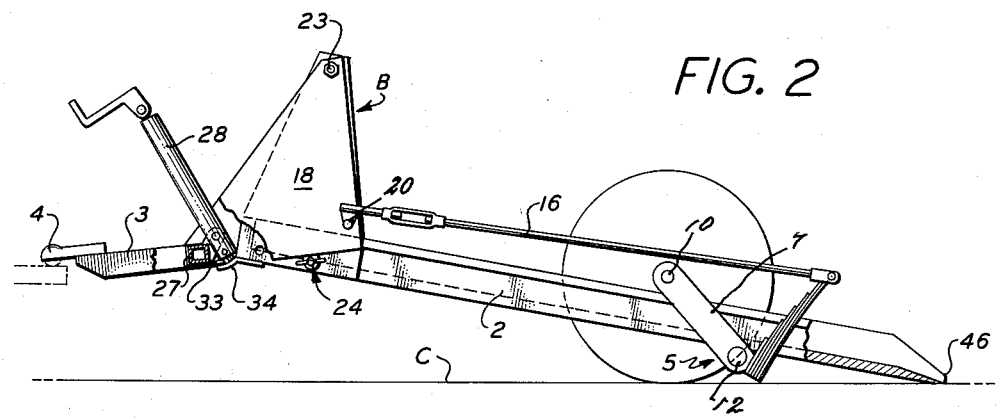
FIG. 2
FIG. 3
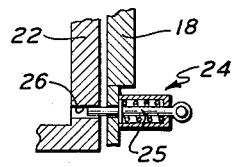
FIG. 4
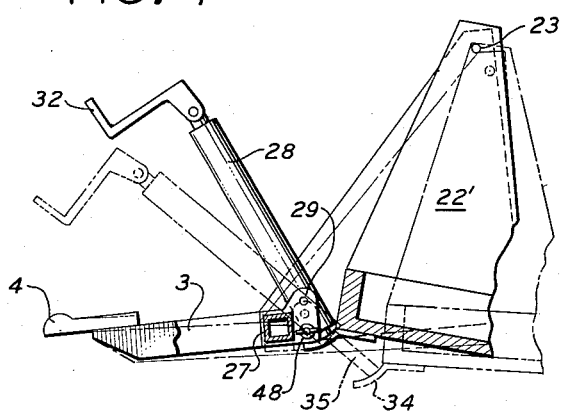
FIG. 5
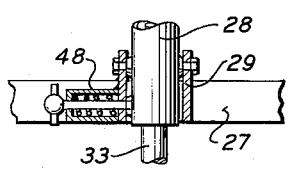
ARTHUR G. SCHRAMM,
INVENTOR.
BY *Scott L. Norvied*
ATTORNEY July 4, 1961   A. G. SCHRAMM   2,990,966
SELF LOWERING TILT BED TRAILER
Filed March 18, 1958   3 Sheets-Sheet 2

ARTHUR G. SCHRAMM,
INVENTOR.

BY

ATTORNEY

July 4, 1961 — A. G. SCHRAMM — 2,990,966
SELF LOWERING TILT BED TRAILER
Filed March 18, 1958 — 3 Sheets-Sheet 3
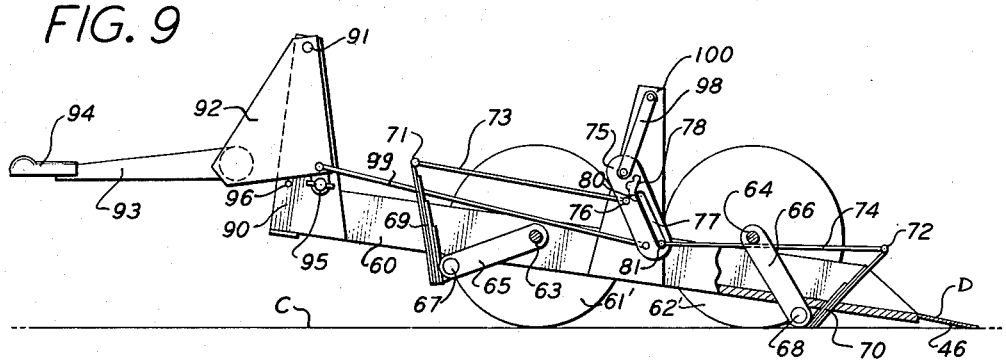
FIG. 9
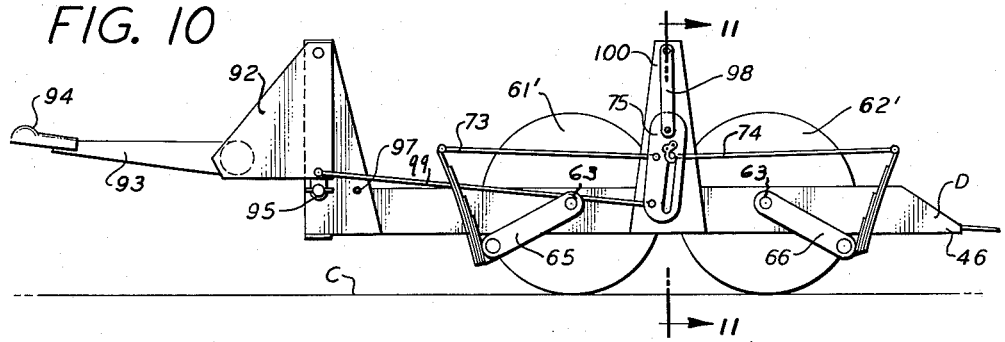
FIG. 10
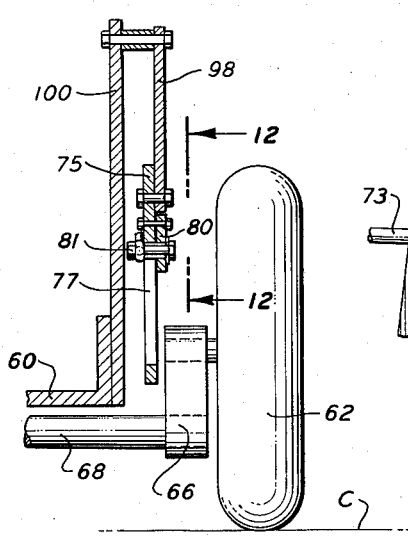
FIG. 11
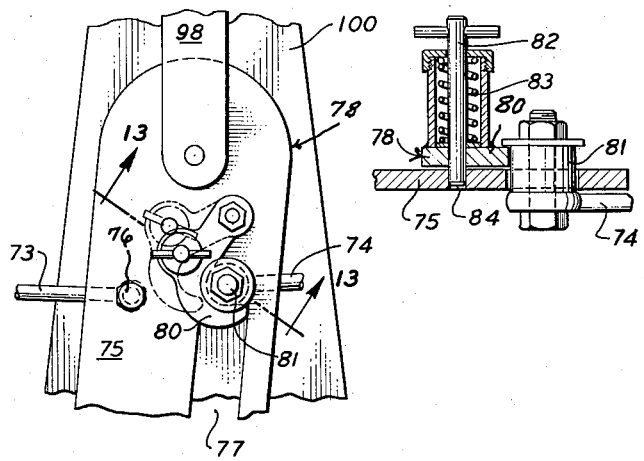
FIG. 12
FIG. 13
ARTHUR G. SCHRAMM,
INVENTOR.
BY Scott L. Norvel
ATTORNEY United States Patent Office 2,990,966
Patented July 4, 1961

2,990,966
SELF LOWERING TILT BED TRAILER
Arthur G. Schramm, Phoenix, Ariz.
Filed Mar. 18, 1958, Ser. No. 722,241
6 Claims. (Cl. 214—505)

This invention pertains to self lowering tilt bed trailers.

One of the objects of the invention is to provide a trailer for carrying various loads which will tilt so that the rear edge rests on the ground and at the same time the bed will lower so that the angle of tilt is at a minimum; said operation being carried on without the need for mechanical power;

Another object of the invention is to provide a trailer having a bed supported on wheels journalled on stub axles supported by wheel arms resiliently by means of a pull rod connected to a tongue portion which is pivotally mounted at the front end of the trailer; said parts being arranged so that hinging action of the tongue part on the pivot at the front end of the trailer will operate a wheel suspension to raise and lower the trailer bed;

Still another object is to provide a trailer of the type just described which may be used with tandem wheel suspension;

Still another object is to provide a trailer supported on wheels which operate on wheel arms adapted to be raised and lowered relative to the trailer bed, and having a raised pivot support for the tongue at the front end of the body, all of which is pivotally attached to a tongue so that when the front end of the tongue is depressed the trailer body will be raised at the front and lowered at the rear end to receive heavy objects and conversely when heavy objects are moved to the fore part of the trailer bed the bed will tend to lower at the front end and at the same time will lower the wheels with reference to the body.

Other objects will appear hereinafter.

I attain the foregoing objects by means of the devices, parts and combinations of parts shown in the accompanying drawings, in which—

FIGURE 1 is a side elevational view of the trailer in levelled position and with a dolly wheel supporting the front end;

FIGURE 2 is a side elevational view of the trailer with the bed tilted to the rear for loading heavy objects and with the front end of the tongue lower than the front end of the bed;

FIGURE 3 is a fragmentary view shown in section and taken substantially on line 3—3 of FIGURE 1, and drawn on an enlarged scale;

FIGURE 4 is a partial view of the front end of the trailer body and the tongue with parts sectioned to show the interior construction;

FIGURE 5 is a fragmentary view of the front end portion of the trailer, sectioned substantially on line 5—5 of FIGURE 1, and drawn on an enlarged scale, and showing the latching mechanism of the front end jack;

FIGURE 9 is a side elevational view of a modified form of the trailer having tandem wheels on each side, with the parts positioned to receive a load;

FIGURE 10 is a side elevational view of the trailer as shown in FIGURE 9 with the parts in riding position;

FIGURE 11 is a sectional view of a portion of the trailer as shown in FIGURE 10; said section being taken substantially on line 11—11 of FIGURE 10 and drawn on an enlarged scale;

FIGURE 12 is a fragment of the structure shown in FIGURE 10 showing the latching mechanism and drawn on an enlarged scale;

FIGURE 13 is a section of the parts shown in FIGURE 12, taken substantially on line 13—13 and drawn on an enlarged scale.

Similar numerals refer to similar parts in the several views.

Figure 6:
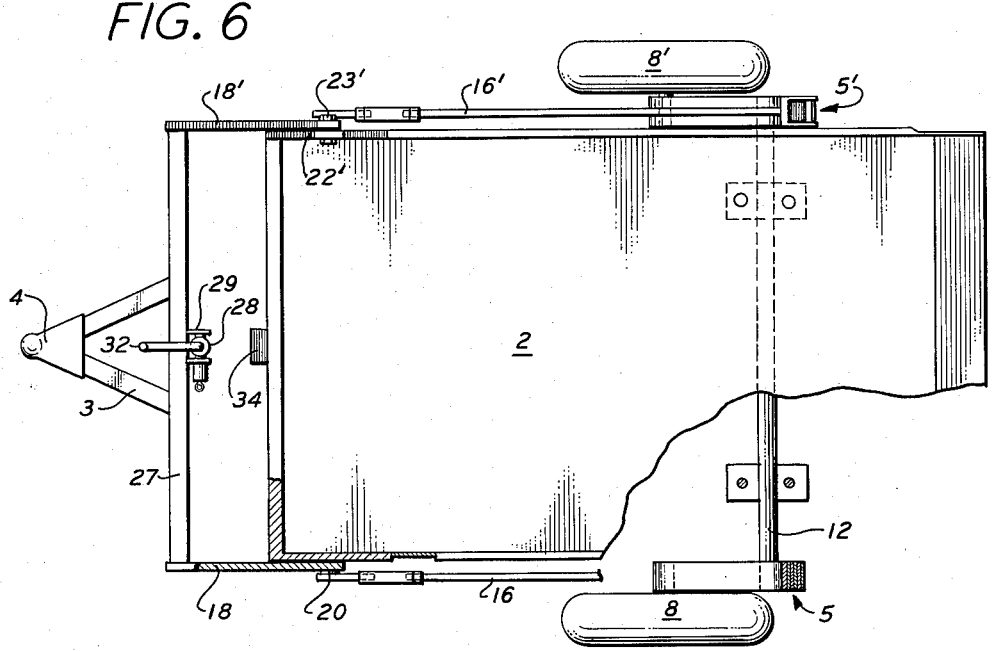
FIGURE 6 is a plan view of the trailer with parts broken away to show interior construction.

Referring to the trailer as shown in the drawings in FIGURES 1 through 6, 3 indicates the tongue which has a hitch 4 at its forward end and 5 indicates the wheel suspension in general.

The wheel suspension consists more particularly of a wheel arm 7 which journals a wheel 8 on an axle spindle 10 at its outer end. The wheel arm is pivotally supported on the bed 2 by a stub shaft 12 at its inner end. A semi-elliptic leaf spring 14 is attached at its butt end to the inner end of the wheel arm adjacent shaft 12. The free end of spring 14 is pivotally attached at 15 to a pull rod 16 which, in turn, is pivotally attached to the lower part of tongue supporting plate 18 by the pivot 20.

While the above description refers to the parts as shown in FIGURE 1, which are the parts on the left hand side of the bed 2, it is to be noted that the right hand counter parts of these several parts are on the right hand side of the trailer bed. The right hand parts are indicated by the same numerals as above used except that the numerals include the prime designation.

At the front end of the trailer bed there are upwardly extending, supporting plates 22 and 22'. These are joined to the tongue plates 18 and 18' by a pivot bearing bolt 23 and 23'. Plates 18 and 18' are on the outside of plates 22 and 22'. These pivot supports are over the bed 2 and enable the tongue, to move from the level position, as shown in FIGURE 1, to the tilted position shown in FIGURE 2. The plates are held in level position by the spring loaded pin type latch 24 shown in detail in FIGURE 3. This indicates that the latch pin 25 is resiliently held in the latch hole 26 in the plate 22.

The tongue members 3 are attached to the middle portion of transverse bar 27 which joins the two vertically extending tongue plates 18 and 18'. The hitch 4 is at the forward end of members 3.

At the center of transverse bar 27 there is a jack 28 which is pivotally mounted on brackets 29 so as to move from the vertical position shown in FIGURE 1 to the forwardly tilted position shown in FIGURE 4. This jack is of ordinary form and contains a threaded shaft 31 operated by a handle 32 which forces the lower end 33 downward to bear on a bracket pad 34. As shown in FIGURE 1, this pad is inoperative, but as shown in FIGURE 2 the jack is tilted so that the lower end of the shaft 31 bears on the pad 34 and downward motion of the shaft will tend to move the tongue relative to the trailer bed so that the two assume the position shown in FIGURE 1, with both parts level and in the same plane.

The lower end 33 of the jack may be inserted in the upper end of the frame 36 of the caster type dolly wheel 39, when desired, to support the tongue and front end of the trailer. In this use the jack is vertical. The jack is held in vertical position when desired by spring latch 48.

Details of the jack supporting mechanism are shown in FIGURE 5.

Figure 7:
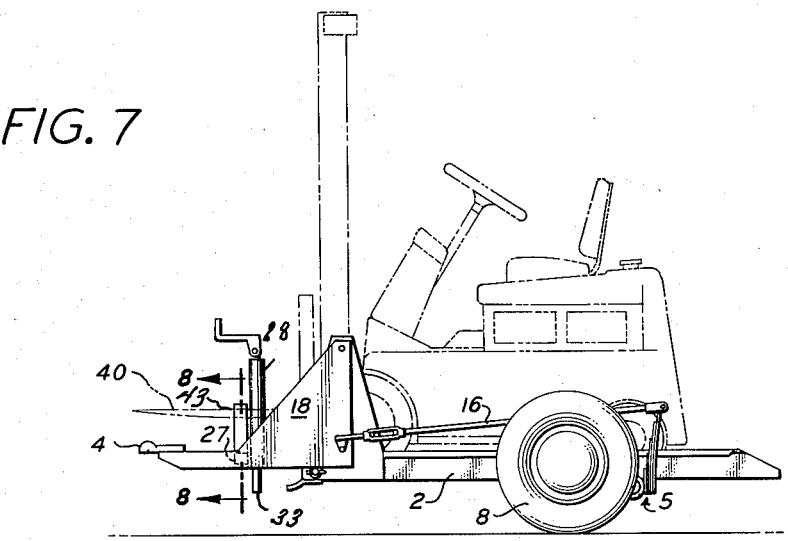
FIGURE 7 is a side elevational view of the trailer showing modification to adapt it to a particular use.
Figure 8:
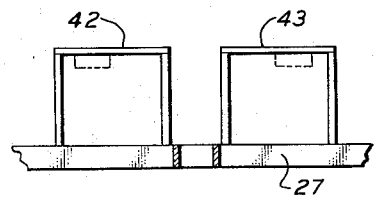
FIGURE 8 is a sectional view of the front end portion of the trailer shown in FIGURE 8 sectioned substantially on line 8—8 of FIGURE 7 and drawn on an enlarged scale.

In the form shown in FIGURE 7 the trailer bed 2 is loaded with a fork truck. The lifting forks 40 of the fork truck extend forward of the trailer bed and enter lifting collars 42 and 43 which extend upward from the transverse bar 27 on the tongue. The forks of the fork truck may then be raised, if desired, and this motion used to lift the tongue structure and straighten the angle of the tongue relative to the top of the bed 2, and move the bed from the tilted loading position to the level running position, as shown in FIGURE 7.

Operation of the trailer is generally accomplished by shifting the load. Considering that the center of support of the trailer bed is in a line A vertically above the wheel spindle 10, the weight of the forward portion of the bed and tongue tends to keep the forward portion of the bed lowered so that it normally assumes the horizontal position shown in FIGURE 1.

If the forward end of the trailer bed is raised or a weight placed on the rear end portion of the trailer bed then it will tend to tilt to the position shown in FIGURE 2 with the rear end positioned on the ground and the forward end B raised. In this position the wheels are raised and moved somewhat to the rear because of the action of the wheel arm 7. This motion is produced by the rearward swinging motion of the plates 18 on the pivot bolt 23, which rearward motion is communicated through the link rod 16 to the upper end of spring 14. This action lowers the bed. Thus, when the bed is tilted for loading it is also lowered. In this way the upward angle of the bed relative to the ground from the rear to the forward end is maintained much less than it would be if the wheels were merely mounted on the bed and the bed tilted.

In order to attain the tilted position it is necessary to release the plate latch 25 from the hole 26. When this is done the weight of the tongue and transverse bar and parts attached thereto is released from the front end and in this position the wheel arms 7 pivot on shafts 12 and 12' and the ends carrying the wheel pivots 10 move upwardly so that the bed tends to assume the tilted and lowered position shown in FIGURE 2. A second hole at the position 44 may then receive and hold the latch pin 25. This holds the tongue in place. A load then may be moved easily onto the trailer bed because the rear edge of the bed 46 is on the ground. The load is easily slid onto the bed because of its low angle relative to the horizontal plane of the ground C.

After the load has been moved onto the bed it is normally positioned ahead of the center of balance so that the forward end of the bed will tend to lower and assume the position shown in FIGURE 1. Optionally the latch 48, which holds the jack vertical, may be released and the jack tilted so that the end 33 of the screw will bear on the pad 34. Operation of the screw of the jack will then push the front edge of the bed or body downward and align the plane of the body with the plane of the tongue and, by this means, the bed may be levelled so that it assumes the position in FIGURE 1.

Optionally, the body may be tilted from the position shown in FIGURE 1 by placing a block back of and under the wheels 8 and 8', releasing latch 24, and pushing the tongue 3 rearwardly. This same method may also be used to level the bed by placing the blocks ahead of wheels 8 and 8' and pulling forwardly on the tongue.

In case the load is far forward of the center of balance, the body may be tilted from the position shown in FIGURE 1 by placing a block back of and under the wheels 8 and 8', or setting brakes, if any, releasing latch 24, and pushing the tongue 3 rearwardly with the pulling vehicle. If the load is far rearwardly of the center of balance this same method may also be used to level the bed by placing the blocks ahead of wheels 8 and 8', or setting the brakes, if any, and pulling forwardly on the tongue, by blocking the wheels or setting the brakes and pulling forwardly on the pulling tongue 3 there is a direct forward pull from hitch 4 through pivot point 20, connecting link 16 to spring pivot point 15 which causes the wheel 8 to lower in relation to the bed 2. This causes the bed to raise at its rearward end 46 into a level position as shown in FIGURE 1, regardless of the position of balance of the load.

The method of raising the forward end of the bed 2 by means of the fork truck has already been mentioned.

From the foregoing it will be undersood that I have provided a simple and rugged trailer construction in which the trailer may be moved from loading position to riding position merely by shifting the point of balance, using the load, or other readily available means to produce the movement. Once the trailer is loaded it may be drawn in the usual manner and the weight of the load is carried on springs 14 while the wheels have a resilient vertical arcuate motion on wheel arms 7.

The modified forms of this trailer, shown in FIGURES 9 through 13, are intended to adopt the same principle, as shown in the primary forms of the device, to tandem wheel suspension.

FIGURE 9 shows a tandem wheel modification in lowered position and FIGURE 10 shows this same modification in raised or running position.

Here 60 indicates the trailer bed which is supported by two wheels on each side, indicated as 61 and 62 for the wheels on the left side and 61' and 62' for the wheels on the right side. These wheels are journalled on spindles 63 and 64 which are on the wheel arms 65 and 66. These wheel arms are, in turn, supported and journalled on stub shafts 67 and 68 which are journalled on blocks on the under side of the trailer bed. Each wheel arm is provided with a spring. Thus, wheel arm 65 is provided with a quarter elliptical spring 69 while wheel arm 66 is provided with a similar spring 70. These springs are arranged so that an inward pull on their outer ends 71 and 72 will cause the wheel arm spindles to lower in reference to the bed and thus raise the bed 60 to the position shown in FIGURE 10.

Motion necessary to move the spring ends inwardly (toward each other) is provided by the pull rods 73 and 74. Pull rod 73 is pivotally attached to a swing plate 75 by a pivot joint 76 disposed in the upper portion of the plate 75. Pull rod 74, which controls the spring 70 on the wheel arm 66 of the rear wheel 62, is pivotally supported in a slot 77 which extends from the lower portion of the plate 75 towards its upper portion and is parallel to its length and located along its rear edge which is adjacent to the rear wheel 62. A latch 78 is pivotally attached to plate 75 near to the upper end of slot 77 and has a hook 80 which is adapted to engage the pivot bearing 81 of the pull rod 74 which operates the rear wheels 62. Details of this latch are shown in FIGURES 12 and 13. The latch pin 82 is provided with a spring 83 which holds it in closed position and forces its inner end into hole 84 in the plate 75. This construction will hold the hook 80 in a position to support the pivot bearing 81 at the top of slot 77 when desired. When the latch pin is not engaged the pivot bearing 81 is free to slide to the bottom end of slot 77, as shown in FIGURE 9, and in this way the rear wheel 62 will be raised further in reference to the bed than the forward wheel 61. This structure is necessary in order to permit the trailer bed 60 to attain the low angle tilted position with its rear end D resting on the ground C.

At the forward end of the trailer bed 60 there is a raised pivot plate 90, the upper portion of which extends above the trailer bed and is provided with a pivot 91. A plate 92 is pivoted at 91 to the plate 90 and carries the tongue structure 93. At the front of the tongue structure there is the usual hitch 94. The tongue structure and plate 92 operate substantially the same as the equivalent parts—tongue structure and hitch—shown in FIGURES 1 through 7. A spring loaded latch 95 will hold the tongue plate 92 in either of two positions by means of insertion of the latch pin in either of two holes 96 and 97. In hole position 96 the tongue latch plate 92 is held forward and by means of rod links 99 pulls the plate 75 to a position where spring pull rod 74 is pulled forward to lower wheels 62 and raise the rear end of the bed to the riding position shown in FIGURE 10. Pivoting action of plate 75 on the pivot 81 at the forward end of spring pull rod 74 will pull spring pull rod 73 rearward so as to lower wheel arm 65, and wheel 61 a short distance. In this connection it is to be understood that plate 75 is pivotally attached at the top to a link 98 which is in turn pivoted to the top of an upwardly extending plate 100 which is attached to approximately the middle of the trailer bed. This means of support and attachment permits the upper end of plate 75 to swing fore and aft a short distance as adjustments are made in the pivot bearings 76 and 81.

In applying the reference numbers to FIGURES 9 through 13 it is to be understood that the reference numbers shown on the parts shown on the left hand side of the trailer bed are without primes, while the numbers with the primes indicate similar parts, if shown on the right hand side of the trailer bed.

In operation this form of the trailer is best suited to carry heavy loads that require more tire surface on the road than in the form first shown. Further, the action of tandem wheels, in going over rough surfaces, is well known and this structure enables the wheel 61 to raise over a raised bump on the road surface while the rear wheel 62 is in a lowered position and conversely when the rear wheel on each side of the trailer bed is raised the forward wheel may or may not be raised. The attachment of the spring pull rods to the swingable plate 75 enables the bed 60 to be lowered with its rear end 46 on the ground. In this position the angle relative to the surface of the ground is small compared with the angle necessary if this peculiar structure is not used.

When the bed is to be lowered the latch 81 is released from hole 84 and the hook 80 permits the pivot 81 to slide downward in slot 77 and in this way wheel 62 is raised sufficiently to lower its support on shaft 68 until the bed end 46 reaches the ground. Meanwhile wheel 61 is raised only slightly. When the trailer bed is again levelled the pivot 81 at the forward end of pull bar 74 is raised to the upper end of slot 77 and again held by the latch hook 80.

I claim:

1. A self lowering tilt bed trailer having a bed, wheels on each side of said bed journalled on wheel spindles extending outward from the forward ends of wheel arms supported on stub shafts at their rear ends journalled on each side of said bed, springs on said wheel arms extending substantially at right angles to the length of said wheel arms, upwardly extending bed supporting plates at the front end of said bed, a tongue structure having a transverse bar at the rear, tongue supporting plates extending upward from said transverse bar, members extending forwardly from said transverse bar, and a tongue hitch at the forward end of said members, pivot bolts extending through said tongue plates and the plates on said bed pivoting on axes above the top of said bed, latches on said tongue plates adapted to engage latch receiving holes in said body supporting plates to hold said bed and tongue in a horizontal plane for a riding position, and in a loading position with the bed slanting downward and rearwardly and the tongue slanting downward and forwardly, rods constituting links pivotally attached to the top free ends of said springs, on each side of said bed, and pivotally attached to the lower portion of said tongue hinge plates so that when said body and tongue are level, and in riding position, said springs hold the wheel arms with the wheels lowered, so that the bed is elevated to riding position and when the body is tilted to loading position said wheels are hinged upward relative to the bed and the bed is lowered toward the ground, and tilted downwardly and rearwardly.

2. In a self lowering tilt bed trailer having a bed, pairs of tandem wheels on each side of said bed, journalled on wheel arms supported on stub shafts journalled on each side of said bed, springs attached to the wheel arms and extending upwardly substantially at right angles to said wheel arms, upwardly extending swing plate supports disposed on each of the sides of said bed midway between each pair of tandem wheels, swing plates pivotally supported on links pivotally attached to the tops of said supports, said swing plates having pivots adjacent the upper part of their front edges attaching to pull rods pivoted to the upper ends of the springs of the forward wheels and slots parallel to and adjacent the rear edges of said swing plates, extending from the upper part to the lower part of the swing plates; said slots retaining pivot bearings on rear pull rods attached to the upper ends of the springs of the rear wheels, latch hooks at the upper ends of said slots releasably holding the pivot bearings at the fore ends of the pull rods attached to the springs of the rear wheels; said swing plates being adapted to permit said pivot bearings to slide in said slots, when said pivot bearings are unhooked, so that said rear wheel springs and wheel arms will raise the rear wheels until the rear end of the bed rests on the ground, upwardly extending pivot plates on each side of the front portion of said bed; a tongue structure at the forward end of said trailer bed having a hitch at the fore end, and laterally disposed tongue supporting plates at the rear end, enclosing the pivot plates on said body, pivoted to said pivot plates above said bed, and having latch means to hold said tongue supporting plates at a forward position or a rear position and bar links pivotally connecting the lower portions of said tongue supporting plates with the lower portions of said swing plates, to swing the swing plates with the tongue supporting plates and operate the wheel raising and lowering mechanism.

3. In a self lowering tilt bed trailer having a bed, pairs of tandem wheels on each side of said bed, each tandem pair of wheels being supported on wheel arms pivotally attached to the respective sides of said bed, a tongue structure including supporting plates pivoted to upwardly extending bed plates on pivot bolt bearings above the upper face of said bed, springs on said wheel arms, linkage joining the wheel arm springs of each tandem pair of springs to raise and lower said wheels relative to said bed, including pivot plates having slots to permit the rear wheels of said tandem pairs to raise more in relation to the bed than the forward wheels so that the body will slant and the rear of said body will rest on the ground, and link rods connecting said tongue supporting plates with said linkage operating said wheel arm springs to operate said wheel arm springs by the pivotal hinging motion of said tongue structure relative to said bed.

4. A self lowering tilt bed trailer composed of a bed having upright pivot plates on each side of the front portion of said bed, a tongue structure including a transverse rear bar, forwardly extending members and a hitch on the fore portion of said members, upwardly extending tongue support plates on each side of the rear portion of said tongue structure disposed with their inner faces bearing against the outer faces of said pivot plates, pivot bearings attaching said plates pivotally above the level of said bed, means connecting the lower portion of said plate to said wheel arms to raise and lower said wheel arms when said plate is pivoted, latches limiting the pivotal movement of said tongue supporting plates at a level riding position and a tilted loading position, wheels on each side of said bed supported on wheel arms and adapted to raise said bed, and lower said bed while it is tilted to the rear by movement of said tongue supporting plates.

5. A self lowering tilt bed trailer composed of a bed having upright pivot plates on each side of the front portion of said bed, a tongue structure including a transverse rear bar, forwardly extending members and a hitch on the fore portion of said members, upwardly extending tongue support plates on each side of the rear portion of said tongue structure disposed with their inner faces bearing against the outer faces of said pivot plates, pivot bearings attaching said plates pivotally above the level of said bed so that the lower portions of said tongue plates may have a fore and aft swinging motion, latches limiting the pivotal movement of said tongue supporting plates at a level riding position and a tilted loading position, wheels on each side of said bed supported on wheel arms and adapted to raise said bed, and lower said bed while it is tilted to the rear by movement of said tongue supporting plates; said movement being communicated to said wheel arms through the means of rod links joining the lower portions of said plates and the wheel supporting springs on each of said wheel arms.

6. A self lowering tilt bed trailer having a bed, upwardly extending hinge plates at the forward end of each side of said bed, wheels operating on spindles at the forward ends of wheel arms on each side of said bed, stub shafts journalled in said bed at the rear ends of said wheel arms, springs extending upwardly at substantially right angles to said wheel arms, a tongue structure having a hitch at the forward end and a rear end including a transverse bar provided with upwardly extending tongue plates on each side of the rear of said tongue structure disposed in slidable contact with the outer faces of the plates on said body, bearing pins pivotally attached to the top portions of the plates on said body and said tongue plates hinging said tongue to the bed at positions above said bed, links pivotally connecting the upper free ends of each of said springs with the lower portions of each of said tongue plates, latching means holding said tongue plates in a forward riding position with the bed of said trailer level and in a plane with said tongue structure, and in a rearward loading position with the forward end of said bed elevated and with the rear of said bed lowered toward the ground, and with the tongue structure disposed at an angle, slanting downwardly and forwardly; said links moving the upper ends of said springs forwardly to lower said wheels relative to said bed and to raise said bed when the lower end portions of said tongue plates are moved forward to riding position.

References Cited in the file of this patent

UNITED STATES PATENTS

| | | |
|---|---|---|
| 2,609,953 | Schramm | Sept. 9, 1952 |
| 2,780,475 | Koerner | Feb. 5, 1957 |
| 2,793,774 | Lovegreen | May 28, 1957 |
| 2,803,362 | Saenz | Aug. 20, 1957 |